United States Patent [19]
Hayes

[11] Patent Number: 5,222,634
[45] Date of Patent: Jun. 29, 1993

[54] DISPENSER HAVING AN AUGER FOR BULK COMESTIBLES

[75] Inventor: Tennis Hayes, Downers Grove, Ill.

[73] Assignee: The Hayes Design Group, Inc., Downers Grove, Ill.

[21] Appl. No.: 850,864

[22] Filed: Mar. 13, 1992

[51] Int. Cl.$^5$ .............................................. B67D 5/00
[52] U.S. Cl. ...................................... 222/181; 222/413
[58] Field of Search ............... 222/181, 185, 233, 278, 222/412, 413; 198/550.1, 550.6

[56] References Cited

U.S. PATENT DOCUMENTS

| | | | |
|---|---|---|---|
| D. 169,901 | 6/1953 | Goldberg | D7/589 |
| D. 276,020 | 10/1984 | Battista | D7/79 |
| D. 282,617 | 2/1986 | Hogan | D7/52 |
| D. 283,869 | 5/1986 | Blahowicz | D7/71 |
| 1,029,431 | 6/1912 | Elliott et al. | 222/243 |
| 1,529,379 | 3/1925 | Thompson | 222/413 |
| 1,734,821 | 11/1929 | Miller | 222/108 |
| 1,751,535 | 3/1930 | Terborg | 222/505 |
| 1,794,326 | 2/1931 | Sierer | 222/413 |
| 1,898,416 | 2/1933 | Wiseman | 222/77 |
| 1,944,663 | 1/1934 | Le May | 222/413 |
| 2,410,410 | 11/1946 | Garubo | 222/184 |
| 2,593,803 | 4/1952 | Schofield | 222/413 X |
| 2,626,089 | 1/1953 | Osfar | 222/511 |
| 2,906,578 | 9/1959 | Sessions | 222/108 X |
| 3,083,879 | 4/1963 | Coleman | 222/143 |
| 4,136,803 | 1/1979 | Tobias et al. | 222/413 |
| 4,176,767 | 12/1979 | Franche | 222/243 |
| 4,189,063 | 2/1979 | Matthiesen | 222/413 X |
| 4,319,700 | 3/1982 | Celender et al. | 222/511 |
| 4,349,128 | 9/1982 | Sanfilippo | 222/166 |
| 4,562,941 | 1/1986 | Sanfilippo | 222/108 |
| 4,619,379 | 10/1986 | Biehl | 222/153 |
| 4,802,609 | 2/1989 | Morse et al. | 222/185 X |
| 4,997,109 | 3/1991 | Carper | 222/413 X |
| 5,054,657 | 10/1991 | Morse et al. | 222/412 X |
| 5,105,991 | 4/1992 | Johnson | 222/181 X |

FOREIGN PATENT DOCUMENTS 2218410 11/1989 United Kingdom ................ 222/412

Primary Examiner—Andres Kashnikow
Assistant Examiner—Anthoula Pomrening
Attorney, Agent, or Firm—Dressler, Goldsmith, Shore, Sutker & Milnamow, Ltd.

[57] ABSTRACT

A dispenser for bulk comestibles comprises a bin, a trough disposed beneath the bin, and an auger rotatable on the trough. The bin has a floor sloping downwardly and backwardly and defining an aperture in a back portion of the bin. The auger is disposed to underlie the aperture. The auger is made from a metal rod coiled to provide a vane. The auger has a relatively wide pitch except for a front portion having a relatively narrow pitch. A door mounted pivotably on the trough is pivotable between a position wherein the door closes an outlet for the trough and a position wherein the door is disposed away from the outlet. A spring biases the door to the outlet-closing position.

16 Claims, 3 Drawing Sheets

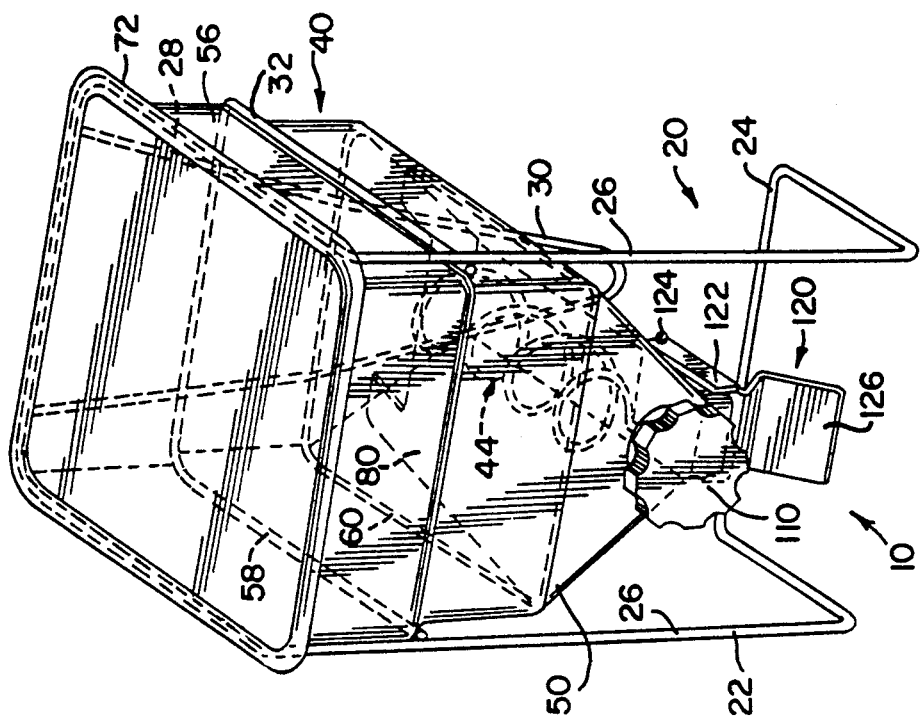
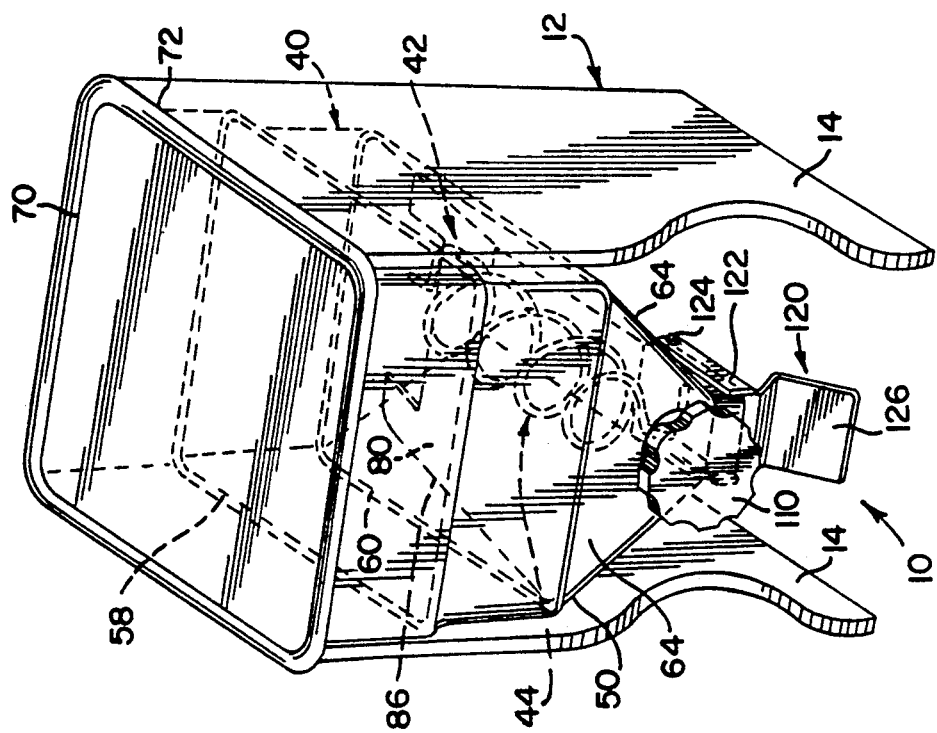

DISPENSER HAVING AN AUGER FOR BULK COMESTIBLES

TECHNICAL FIELD OF THE INVENTION

This invention pertains to a dispenser for dispensing controlled amounts of bulk comestibles comprised of hard, not easily broken pieces or more fragile pieces, such as cereal flakes or puffed cereal.

BACKGROUND OF THE INVENTION

Numerous dispensers have been developed heretofore for dispensing bulk comestibles comprised of hard, not easily broken pieces, such as coffee beans, hard candies, or nuts in their shells. Typically, such a dispenser comprises a bin having a lower outlet and a door or similar structure for opening and closing the outlet. Because bulk comestible dispensers known heretofore tend to crush such fragile comestibles as cereal flakes or puffed cereals, their use has been limited to dispensing bulk comestibles comprised of hard, not easily broken pieces There has been a need, to which this invention is addressed, for an improved dispenser for dispensing controlled amounts of bulk comestibles comprised of hard, not easily broken pieces or more fragile pieces in closely controlled amounts.

SUMMARY OF THE INVENTION

This invention provides an improved, sanitary dispenser for dispensing controlled amounts of bulk comestibles comprised of loose pieces. Because the dispenser is constructed to minimize crushing of such fragile comestibles as cereal flakes or puffed cereals, the dispenser is useful in institutional kitchens, self-service cafeterias, and other locations where such fragile comestibles are served, as well as in retail food stores and other locations where bulk comestibles comprised of less easily broken pieces are dispensed.

The dispenser comprises a bin adapted to hold a supply of bulk comestibles, a trough disposed beneath the body, and an auger mounted for rotation in the trough. The bin comprises a body having walls and a floor sloping downwardly and backwardly. The floor defines an aperture in a back portion of the bin. The trough has a back section disposed to receive bulk comestibles through the aperture and a front section having a discharge outlet. The trough may be substantially horizontal or may slope downwardly and backwardly. The auger is rotatable to convey bulk comestibles in controlled amounts from the back section to the front section for discharge through the discharge outlet.

In a preferred construction, the dispenser further comprises a door mounted on the trough and movable between a first position and a second position. In the first position, the door is disposed to close the discharge outlet. In the second position, the door is disposed away from the discharge outlet to permit discharge therethrough. The door may be pivotably mounted to the trough so as to be downwardly pivotable from the first position to the second position. The dispenser may further comprise a spring for biasing the door to the first position.

Preferably, the floor is separate from the walls of the bin body and is removable therefrom. Preferably, moreover, such walls include a front wall defining a front shelf, a back wall, and two side walls tapering downwardly and inwardly. The floor may have a front edge supported on the front shelf and a back edge resting against the back wall. The floor also may have two side edges tapering backwardly and inwardly so as to fit between the side walls.

In the preferred construction, the bin body and the trough are integral, and the floor is separate and removable. Alternatively, the bin body and the floor may be integrally formed, and the bin body and the trough may be removably attached to each other.

It is preferred for the auger to have a relatively wide pitch, except for a front portion having a relatively narrow pitch. The auger may be closely adjacent to the floor and may have a vane closely adjacent to the aperture to help in controlling and limiting flow of bulk comestibles through the aperture until the auger is rotated. The auger may be formed from a metal rod, which may be coiled to provide the vane, such as a metal rod at least 0.25 inch in diameter.

It is desirable for the auger to be manually rotatable in a rotational direction enabling the auger to convey bulk comestibles from the back section to the front section. It is desirable, moreover, for the auger to be manually rotatable in an opposite direction to dislodge any comestibles jamming the dispenser near the auger.

These and other objects, features, and advantages of this invention are evident from the following description of certain embodiments of this invention with reference to the accompanying drawings.

BRIEF DESCRIPTION OF THE DRAWINGS

FIG. 1 is a perspective view of a dispenser for bulk comestibles comprised of loose pieces, in accordance with a preferred embodiment of this invention. The dispenser is shown as mounted on a preferred stand.

FIG. 2 is a perspective view of the dispenser mounted on an alternative stand.

DETAILED DESCRIPTION OF ILLUSTRATED EMBODIMENTS

As shown in FIGS. 1 through 4, a dispenser 10 for bulk comestibles comprised of loose pieces constitutes a preferred embodiment of this invention. The dispenser 10 is useful to dispense hard, not easily broken pieces, such as coffee beans, hard candies, or nuts in their shells. The dispenser 10 also is useful to dispense such fragile comestibles as cereal flakes or puffed cereals.

Figure 3:
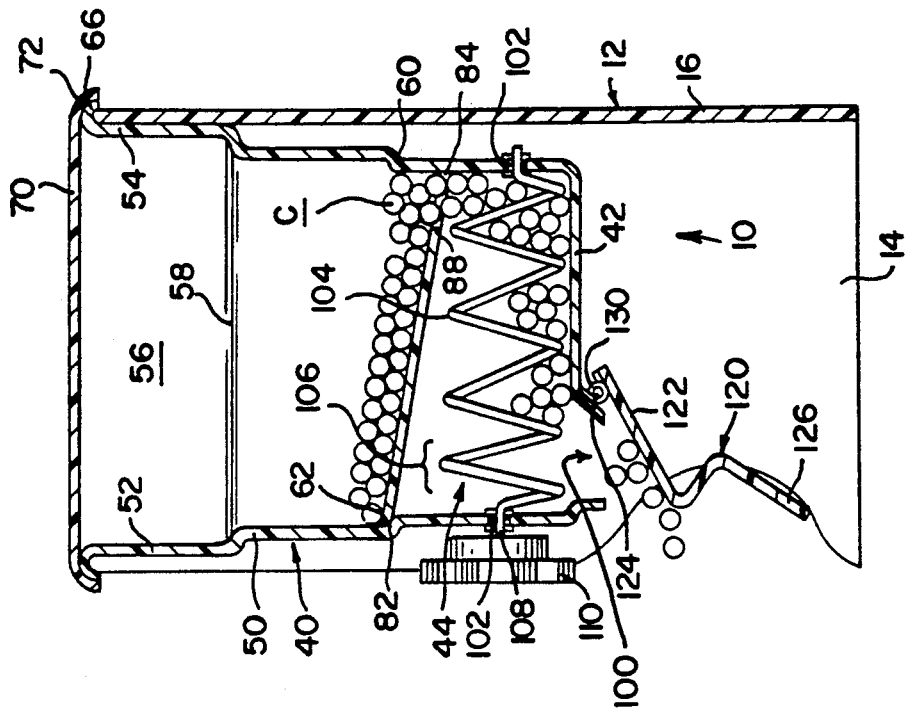
FIG. 3 is a sectional view taken along a vertical plane through the dispenser with a door shown in a closed position.
Figure 4:
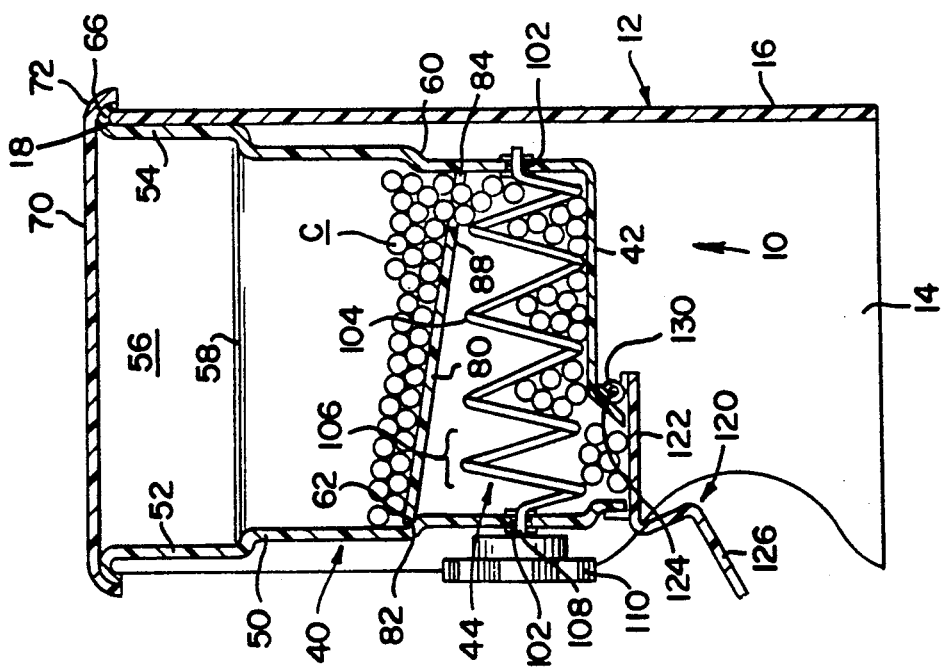
FIG. 4 is a similar view showing the door in an open position.

As shown in FIGS. 1, 3, and 4, the dispenser 10 is mounted removably on a preferred stand 12 formed of a suitable material, such as high impact polystyrene. The stand 12 has two side panels 14 and a back panel 16. The stand has an upper edge 18 (see FIG. 3) which is generally U-shaped and which opens frontwardly.

As shown in FIG. 2, the dispenser 10 is mounted removably on an alternative stand 20 formed of two wire members and coated with a suitable plastic, such as polyvinyl chloride. A first wire member 22 is bent to define a generally U-shaped base 24 opening frontwardly, two front uprights 26, a generally U-shaped rim 28, and a generally V-shaped back strut 30. A second wire member 32 is generally U-shaped and opens frontwardly. The second member 32 is welded to the front uprights 26 and to the back strut 30, beneath the first wire member 22, so as to be vertically spaced from the first wire member 22.

Broadly, the dispenser 10 comprises a bin 40, a trough 42, and an auger 44. The bin 40 is shown in FIGS. 3 and 4 as holding a supply of bulk comestibles C, which may be comprised of relatively fragile pieces, such as cereal flakes.

The bin 40 has a body 50, which may be vacuum-formed from a suitable, preferably transparent plastic, such as glycol-modified polyester (PETG) copolymer of 200 gauge before forming. The bin body 50 has a front wall 52, a back wall 54, and two side walls 56. The body 50 is formed so as to have an upper step 58 and a lower step 60. These steps reinforce the walls of the bin body 50. At the front wall 52, the lower step 60 includes a front shelf 62 for another purpose to be later described. The side walls 56 have lower portions 64 (see FIG. 1) tapering downwardly and inwardly. The trough 42 is formed integrally with the bin body 50 and includes the tapering portions 64 of the side walls 56.

Preferably, as shown, the trough 42 and its base are substantially horizontal. Alternatively, as suggested in dashed lines in FIG. 3, the trough 42 may slope downwardly and backwardly.

The bin body 50 has an upper, overturned, peripheral lip 66 supporting the bin 40 on the upper edge 18 of the stand 12, as shown in FIGS. 1, 3, and 4, or on the rim 28 of the stand 20, as shown in FIG. 2. If the stand 20 is used, the lower step 60 rests on the second member 32, which thus helps to support the bin 40 and its contents. The bin 40 has a removable cover 70 formed of a suitable plastic, such as high strength polystyrene. The cover 70 has a peripheral lip 72 fitting over the lip 66 when the cover 70 is placed on the bin 40.

The bin 40 has a removable floor 80, which is formed separately, as from the plastic used to form the bin body 50 and the integral trough 42. The floor 80 has a front edge 82 supported on the front shelf 62, a back edge 84 resting against the back wall 54, and two side edges 86 (see FIG. 1) tapering backwardly and inwardly so as to fit between the side walls 56. Because the tapered side edges 86 engage and are supported by the tapered portions 64 of the side walls 56, the floor 80 slopes downwardly and backwardly, as shown.

In a back portion of the bin 40, the floor 80 has a generally rectangular aperture 88, which is open at the back edge 84 of the floor 80. The trough 42 has a back section disposed beneath the back portion of the bin 40 to receive bulk comestibles C through the aperture 88. The trough 42 has a front section disposed beneath a front portion of the bin 40 and having a discharge outlet 100 opening downwardly.

The auger 44 extends along the trough 42 and is mounted for rotation on the trough 42, via bushings 102 mounted in the front and back walls of the bin body 50. The bushings 102 are made from a suitable plastic, such as polytetrafluoroethylene (PTFE). Metal bushings may be alternatively used. The auger 44 is made from a chrome-plated or stainless steel wire having a nominal diameter of at least 0.25 inch and is coiled to provide a vane 104. As shown in FIGS. 3 and 4, the auger 44 has a relatively wide pitch, except for a front portion 106 having a relatively narrow pitch.

One end 108 of the wire forming the auger 44 extends through the bushing 102 mounted in the front walls 52 of the bin body 50. A large knob 110 is mounted on and fixed to the end 108 for conjoint rotation with the auger 44. The knob 110 enables the auger 44 to be manually rotated in the bushings 102. When rotated in one rotational sense, which is clockwise in FIGS. 1 and 2, the auger 44 conveys bulk comestibles along the trough 42, toward the discharge outlet 100. Although there is little tendency for most comestibles to jam the dispenser 10, dried fruits and like comestibles may jam the dispenser 10 occasionally. The auger 44 can be oppositely rotated to dislodge any comestibles jamming the dispenser 10 between the vane 104 of the auger 44 and the back wall 54 or elsewhere near the auger 44.

The dispenser 10 further comprises a door 120 having a chute portion 122 mounted pivotably to the trough 42, via a pivot pin 124, and having a handle portion 126 extending frontwardly and downwardly from the chute portion 122. The door 120 is pivotable downwardly between a first, closed position (see FIGS. 1, 2, and 3) and a second, open position (see FIG. 4) and is biased to the first, closed position by a torsion spring 130 coiled around the pivot pin 124.

In the first, closed position, the door 120 is disposed to close the discharge outlet 100. In the second, open position, the door 120 is disposed away from the discharge outlet 100 to permit discharge of bulk comestibles through the discharge outlet 100. In the second, open position, the chute portion 122 of the door 120 is disposed to guide bulk comestibles from the discharge outlet 100.

As shown in FIGS. 3 and 4, the auger 44 is disposed beneath the floor 80 so as to be closely adjacent the floor 80. Thus, a back portion of the vane 104 is closely adjacent to the aperture 88 to help in controlling and limiting flow of bulk comestibles downwardly through the aperture 88 until the auger 44 is rotated.

When it is desired to dispense bulk comestibles from the dispenser 10, a user holds a bag or other receptacle (not shown) beneath the door 120, pivots the door 120 downwardly, and rotates the auger 44 manually to convey bulk comestibles in controlled amounts from the dispenser 10. The trough 42 and the auger 44 prevent bulk comestibles from spilling in an uncontrolled manner from the dispenser 10.

Figure 6:
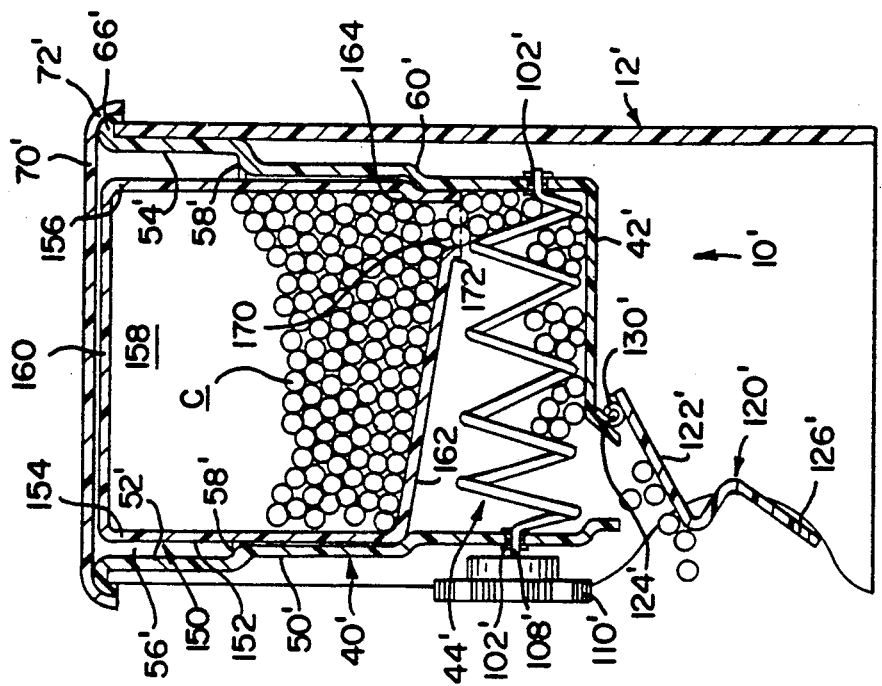
FIG. 6 is a similar view with the door in an open position.
Figure 5:
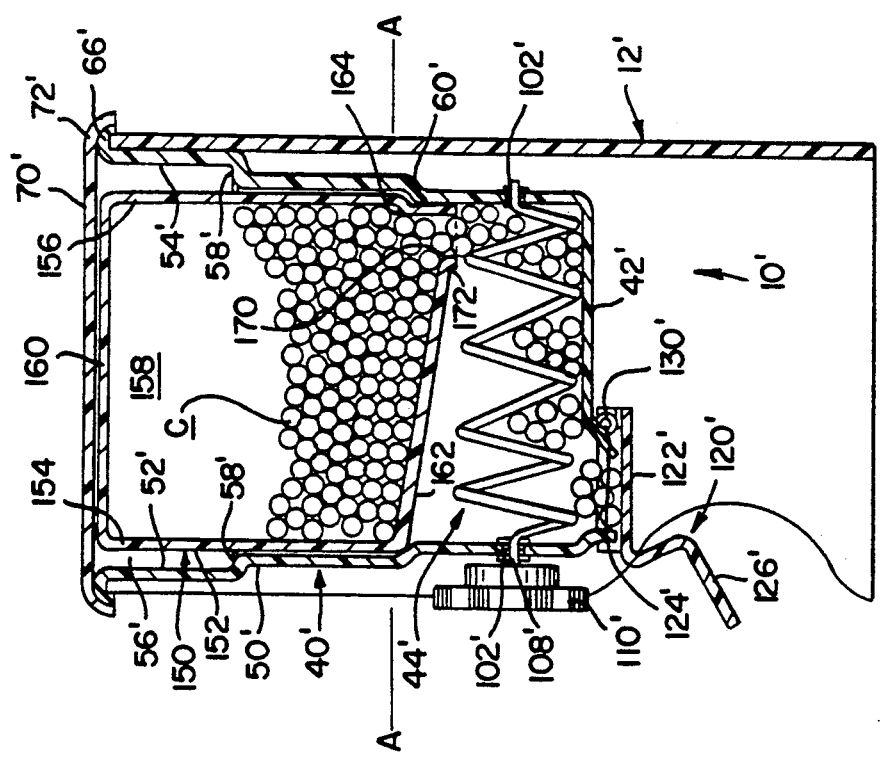
FIG. 5 is a similar view of a dispenser in accordance with an alternative embodiment of this invention. A door is shown in a closed position.

As shown in FIGS. 5 and 6, a dispenser 10' for bulk comestibles comprised of loose pieces constitutes an alternative embodiment of this invention. Except as shown and described, the dispenser 10' is similar to the dispenser 10 and operates similarly, and elements designated by primed numbers in FIGS. 5 and 6 are similar to elements designated by the same, unprimed numbers in FIGS. 1 through 4.

As shown, the dispenser 10' is mounted on a stand 12' similar to the stand 12. Alternatively, the dispenser 10' may be mounted on a stand (not shown) similar to the stand 20.

Broadly, the dispenser 10' comprises an outer bin 40', an integral trough 42', and an auger 44'. The outer bin 40' has a body 50'. The body 50' has a front wall 52', a back wall 54', and two side walls 56' (one shown) and is formed to have an upper step 58' and a lower step 60'. These steps reinforce the walls of the bin body 50'.

The bin body 50' has an upper, overturned, peripheral lip 66' supporting the outer bin 40' on the upper edge 18' of the stand 12', as shown. The outer bin 40' has a removable cover 70' with a peripheral lip 72' fitting over the lip 66' when the cover 70' is placed on the outer bin 40'.

The auger 44' extends along the trough 42' and is mounted for rotation on the trough 42', via bushings 102' mounted in the front and back walls of the bin body 50'. A large knob 110' is mounted on and fixed to one end 108' of the wire forming the auger 44' for conjoint rotation with the auger 44'.

The dispenser 10' further comprises a door 120'. The door 120' has a chute portion 122' mounted pivotably to the trough 42', via a pivot pin 124', and a handle portion 126'. The door 120' is pivotable downwardly between a first, closed position (see FIG. 5) and a second open position (see FIG. 6) and is biased to the first, closed position by a torsion spring 130' coiled around the pivot pin 124'.

The dispenser 10' has a disposable, removable, inner bin 150 fitted removably into the outer bin 40'. The inner bin 150 is shown as holding a supply of bulk comestibles C, which may be comprised of relatively fragile pieces, such as cereal flakes.

The inner bin 150 resembles a large bottle and may be blow-molded from a suitable plastic, such as polyvinyl chloride. The inner bin 150 has a body 152 with a front wall 154, a back wall 156, and two side walls 158 (one shown) fitting within the front, back, and side walls of the outer bin 40'. The bin body 152 has a wall 160 serving as a lower wall when the inner bin 150 is being filled and as an upper wall when the inner bin 150 has been fitted into the outer bin 40'. The bin body 152 has a wall 162 serving as an upper wall when the inner bin 150 is being filled and as a lower wall when the inner bin 150 has been fitted into the outer bin 40'.

The front, back, and side walls of the bin body 152 are configured to define a shoulder 164 coacting with the lower step 60' of the corresponding walls of the body 50' of the outer bin 40' to support the inner bin 150 within the outer bin 40'. The wall 162 of the bin body 152 is configured to define a floor sloping downwardly and backwardly when the inner bin 150 is fitted into the outer bin 40'.

In a back portion of the inner bin 150 fitted into the outer bin 40', the floor defined by the wall 162 has a circular aperture 170 opening downwardly and a peripheral lip 172 extending downwardly by a short distance and surrounding the aperture 172. The lip 172 accommodates a closure (not shown) such as a snap-on cap or a tear-away seal. The closure is applied after the inner bin 150 has been filled and is removed before the inner bin 150 is fitted into the outer bin 40'.

To assemble the inner bin 150 with the outer bin 40', the inner bin 150 is inverted from its position in FIGS. 5 and 6 so as to rest on the wall 160, the closure is removed, and the outer bin 40' is removed from the stand 12', inverted, and fitted over the inner bin 150. Thereupon, the outer bin 40' is replaced on the stand 12' with the inner bin 150 fitted into the outer bin 40', as shown. The inner bin 150 and the trough 42' integral with the outer bin 40' may be thus regarded as attached removably to each other.

If the stand 12' is not used and the dispenser 10' is supported in another suitable manner, as by a stand (not shown) supporting the outer bin 40' at the lower step 60', upper portions of the outer bin 40' (e.g. those portions above line A—A in FIG. 5) may be then omitted, along with the cover 70'.

Optionally, at least some of the front, back, and side walls of the outer bin 40' and at least some of the corresponding walls of the inner bin 150 may be complementarily configured to enable the inner bin 150 to be snap-fitted or slide-fitted removably into the outer bin 40'.

After the inner bin 150 has been emptied, it may be either discarded and replaced by a similar, filled bin, or cleaned and refilled.

The dispensers described above are sanitary and can be easily cleaned by conventional washing techniques used in institutional kitchens, self-service cafeterias, and retail food stores. These dispensers are constructed to minimize crushing of such fragile comestibles as cereal flakes or puffed cereal.

Various other modifications may be made in the dispensers described above without departing from the scope and spirit of this invention.

What is claimed is:

1. A bulk comestibles dispenser comprising
(a) a bin adapted to hold a supply of bulk comestibles comprised of loose pieces, the bin having a back portion and a front portion and comprising a body having walls and a floor sloping downwardly and backwardly, the floor defining an aperture in the back portion of the bin,
(b) a trough disposed beneath the bin body, the trough having a back section disposed beneath the back portion of the bin to receive bulk comestibles through said aperture and having a front section disposed beneath the front portion of the bin, the front section having a discharge outlet, the trough closing the bottom of the bin except for the discharge outlet, and
(c) an auger mounted for rotation in the trough, the auger being rotatable to convey bulk comestibles in controlled amounts from the back section to the front section for discharge through the discharge outlet,
wherein the bin body and the trough are integral, the floor being separate and removable while the bottom of the bin remains closed by the trough except for the discharge outlet.

2. The dispenser of claim 1 wherein the bin body walls include a front wall, a back wall and two side walls tapering downwardly and inwardly, the floor having two side edges tapering backwardly and inwardly so as to fit between the side walls.

3. A bulk comestibles dispenser comprising
(a) a bin adapted to hold a supply of bulk comestibles comprised of loose pieces, the bin having a back portion and a front portion and comprising a body having walls and a floor sloping downwardly and backwardly, the floor defining an aperture in the back portion of the bin,
(b) a trough disposed beneath the bin body, the trough having a back section disposed beneath the back portion of the bin to receive bulk comestibles through said aperture and having a front section disposed beneath the front portion of the bin, the front section having a discharge outlet, and
(c) an auger mounted for rotation in the trough, the auger being rotatable to convey bulk comestibles in controlled amounts from the back section to the front section for discharge through the discharge outlet,
wherein the floor is separated from the bin body walls and is removable therefrom and wherein the bin body walls include a front wall defining a front shelf, a back wall, and two side walls tapering downwardly and inwardly, the floor having a front edge supported on the front shelf and a back edge resting against the back wall, the floor having two side edges tapering backwardly and inwardly so as to fit between the side walls.

4. The dispenser of claim 3 further comprising a door mounted on the trough and movable between a first, closed position wherein the door is disposed to close the outlet and a second, open position wherein the door is disposed away from the outlet to permit discharge therethrough.

5. The dispenser of claim 4 wherein the door is mounted pivotably to the trough and is pivotable downwardly from the first position to the second position.

6. The dispenser of claim 5 further comprising spring means for biasing the door to the first position.

7. The dispenser of claim 3 wherein the auger has a relatively wide pitch, and a front portion having a relatively narrow pitch.

8. The dispenser of claim 7 wherein the auger is formed from a metal rod coiled to define a vane.

9. The dispenser of claim 8 wherein the metal rod is at least 0.25 inch in diameter.

10. The dispenser of claim 3 wherein the trough is substantially horizontal.

11. The dispenser of claim 3 wherein the trough slopes downwardly and backwardly.

12. The dispenser of claim 3 wherein the auger is mounted to be manually rotated in a rotational direction enabling the auger to convey bulk comestibles from the back section to the front section.

13. The dispenser of claim 12 wherein the auger is mounted to be manually rotated in an opposite direction to dislodge any comestibles jamming the dispenser near the auger.

14. The dispenser of claim 3 wherein the auger is closely adjacent to the floor, the auger having a vane closely adjacent to the aperture for controlling and limiting flow of bulk comestibles through the aperture until the auger is rotated.

15. The dispenser of claim 14 wherein the auger is formed from a metal rod coiled to provide the vane.

16. A bulk comestibles dispenser comprising (a) a bin adapted to hold a supply of bulk comestibles comprised of loose pieces, the bin having a back portion and a front portion and comprising a body having walls and a floor sloping downwardly and backwardly, the floor defining an aperture in the back portion of the bin, (b) a trough disposed beneath the bin body, the trough having a back section disposed beneath the back portion of the bin to receive bulk comestibles through said aperture and having a front section disposed beneath the front portion of the bin, the front section having a discharge outlet, and (c) an auger mounted for rotation in the trough, the auger being rotatable to convey bulk comestibles in controlled amounts from the back section to the front section for discharge through the discharge outlet, wherein the bin body and the trough are integral, the floor being separate and removable and wherein the bin body walls include a front wall defining a front shelf, a back wall, and two side walls tapering downwardly and inwardly, the floor having a front edge supported on the front shelf and a back edge resting on the back wall, the floor having two side edges tapering backwardly so as to fit between the side walls of the bin.

* * * * *